INVENTOR.
MANUEL TURCHAN.

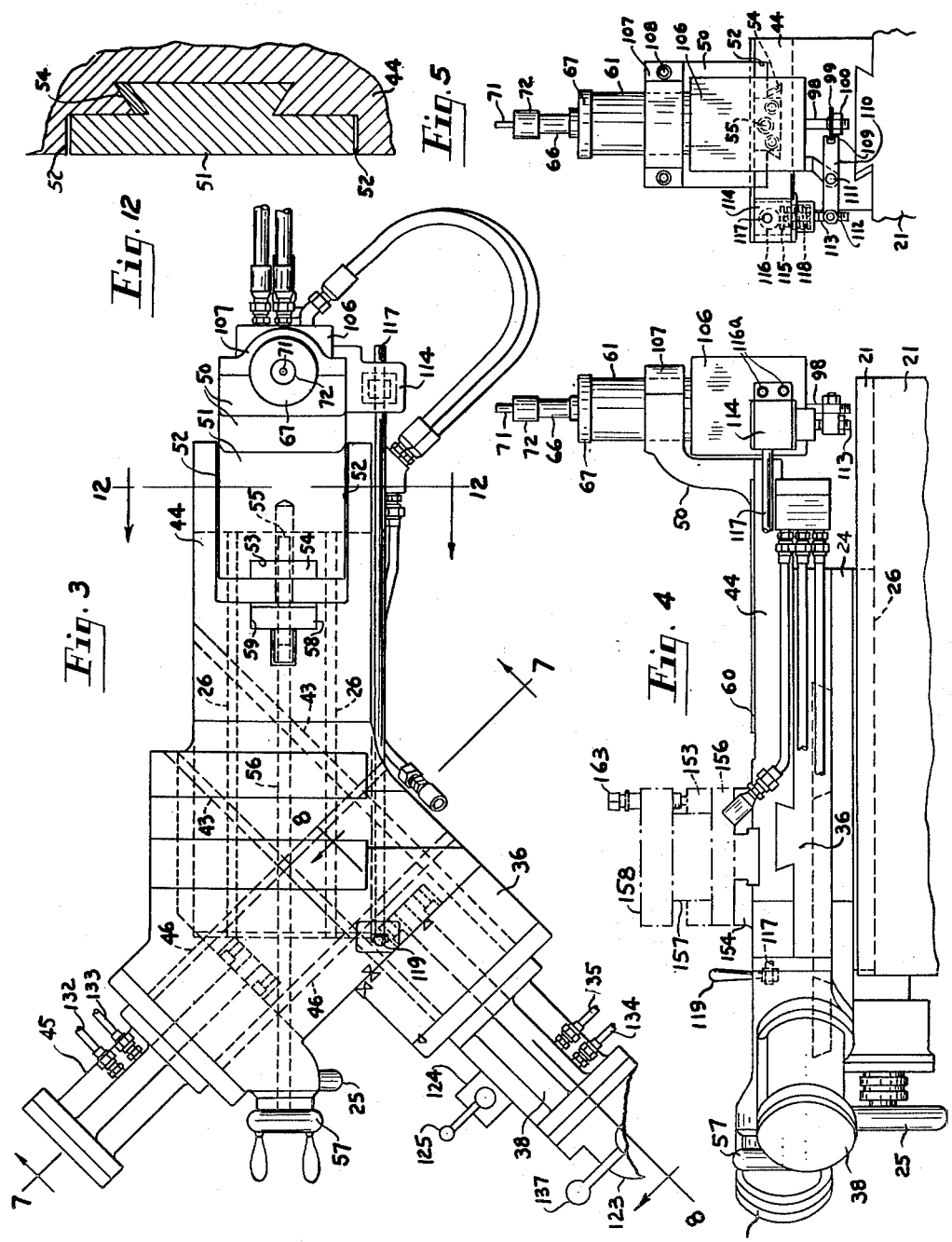

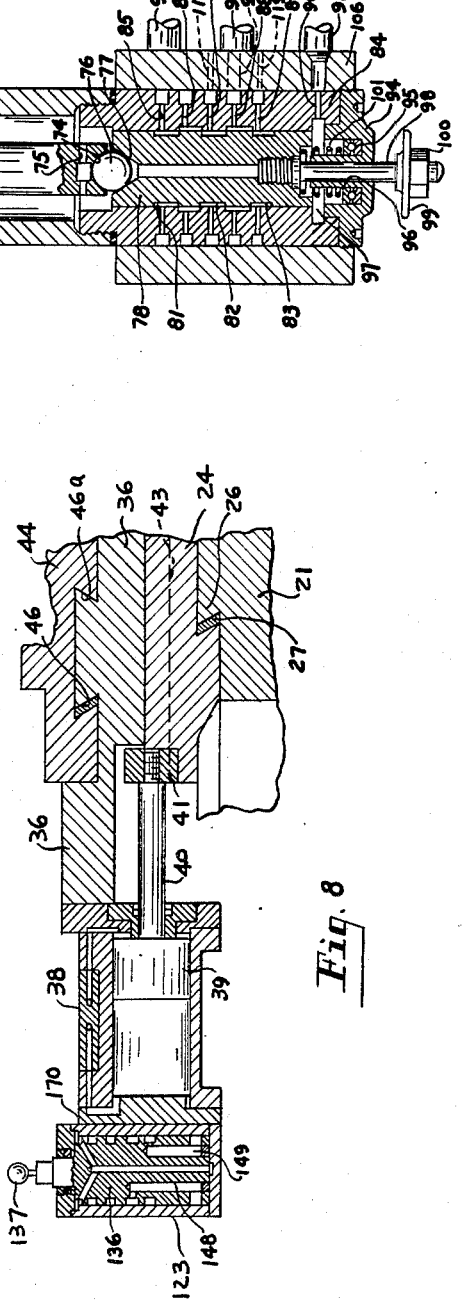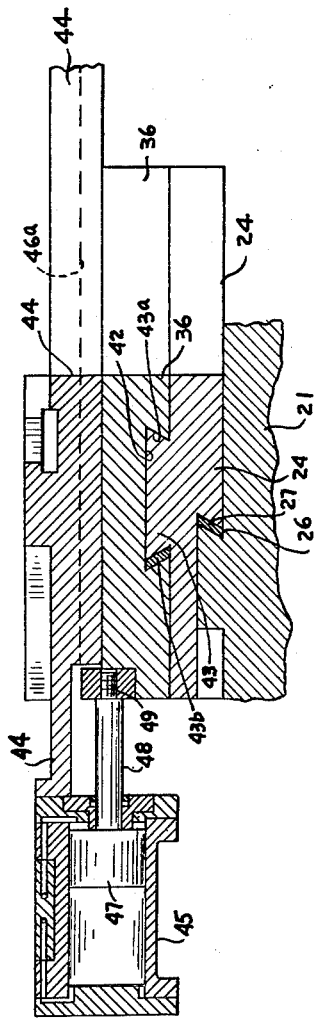

June 24, 1952  M. TURCHAN  2,601,345
TRACER-GUIDED REPRODUCING MACHINE
Filed Dec. 27, 1948  11 Sheets-Sheet 6
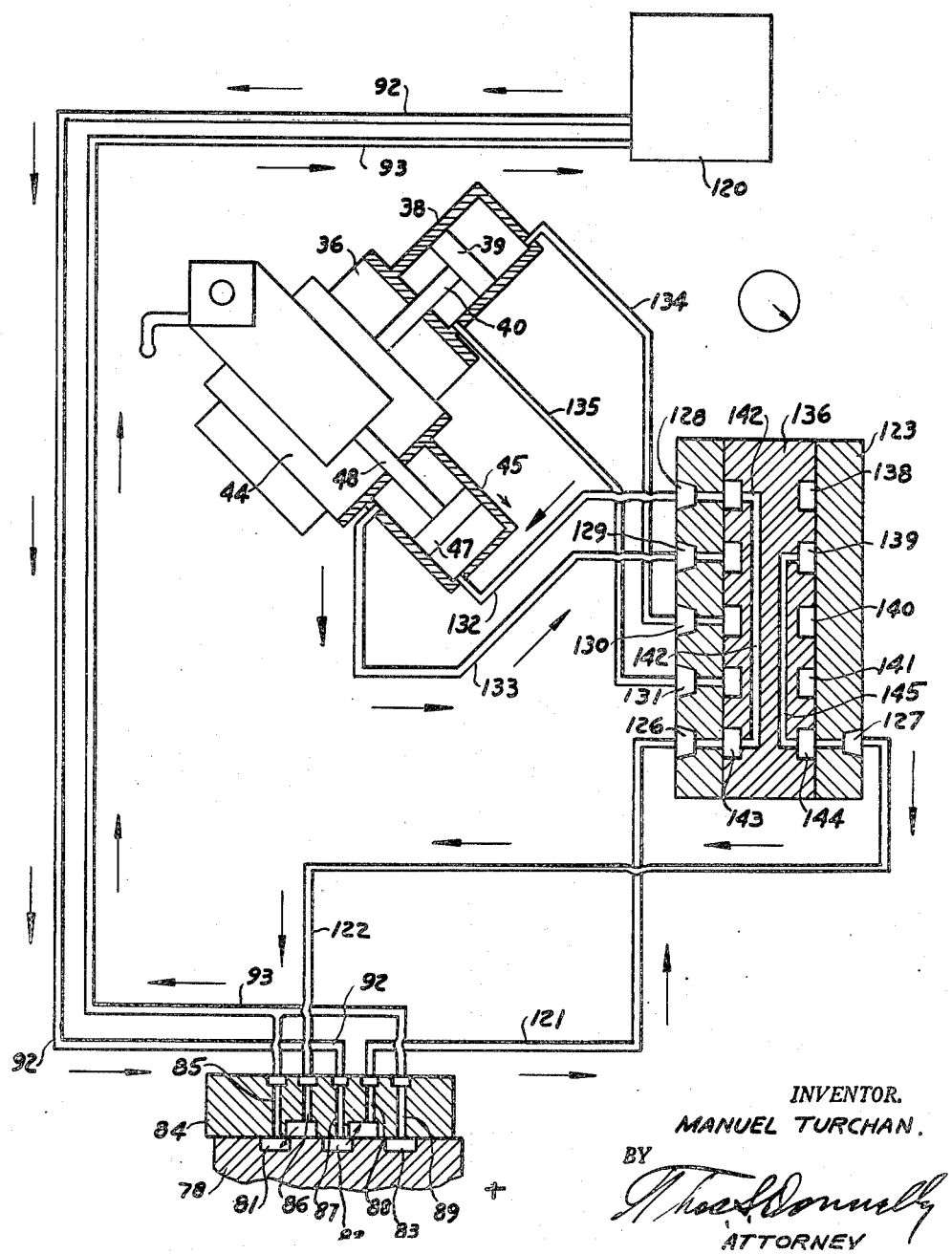
INVENTOR.
MANUEL TURCHAN.
BY
ATTORNEY

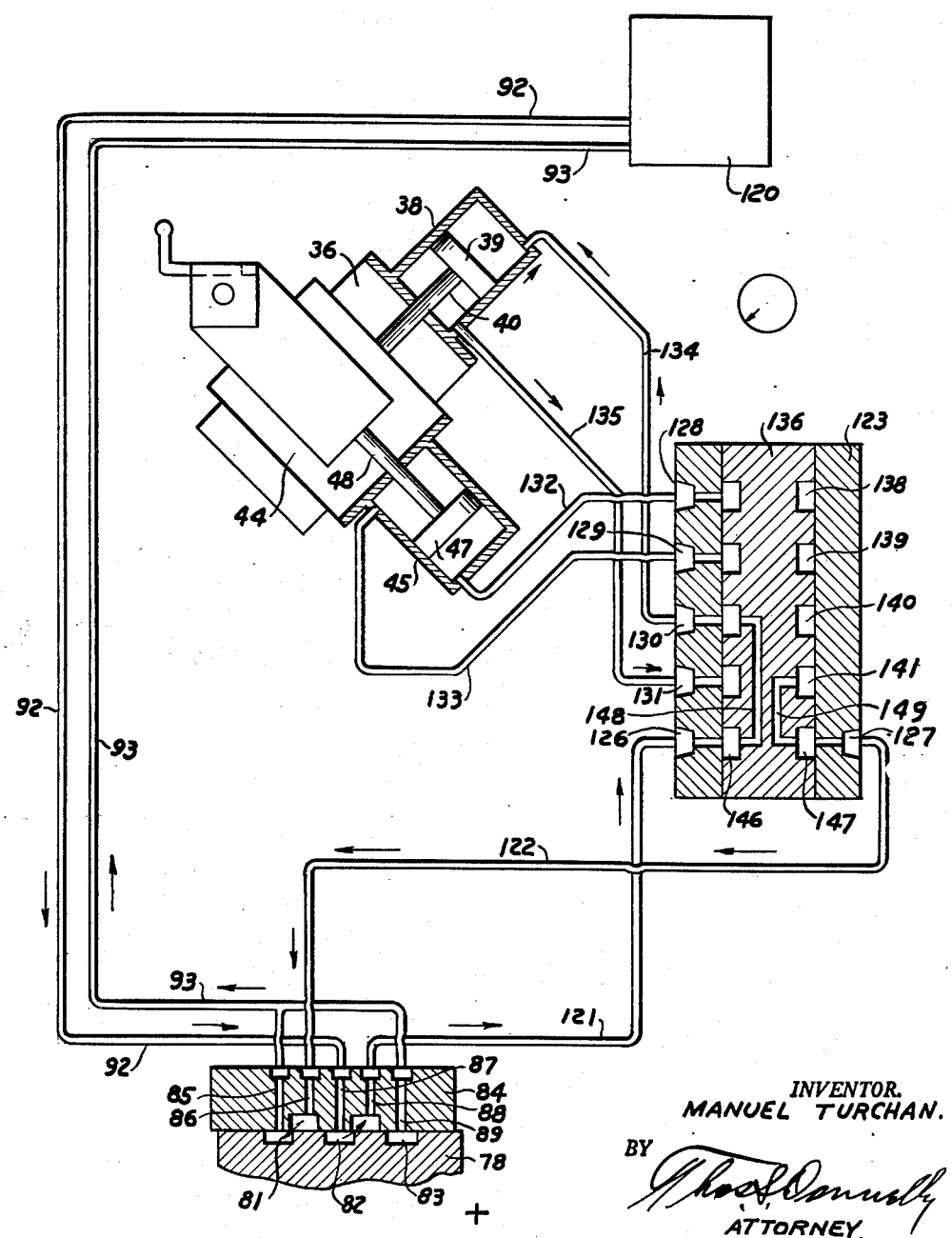

June 24, 1952 M. TURCHAN 2,601,345
TRACER-GUIDED REPRODUCING MACHINE
Filed Dec. 27, 1948 11 Sheets-Sheet 8

INVENTOR.
MANUEL TURCHAN.
BY
Thos L Donnelly
ATTORNEY

June 24, 1952 M. TURCHAN 2,601,345
TRACER-GUIDED REPRODUCING MACHINE
Filed Dec. 27, 1948 11 Sheets-Sheet 10

INVENTOR.
MANUEL TURCHAN.
BY Thos. L. Donnelly
ATTORNEY.

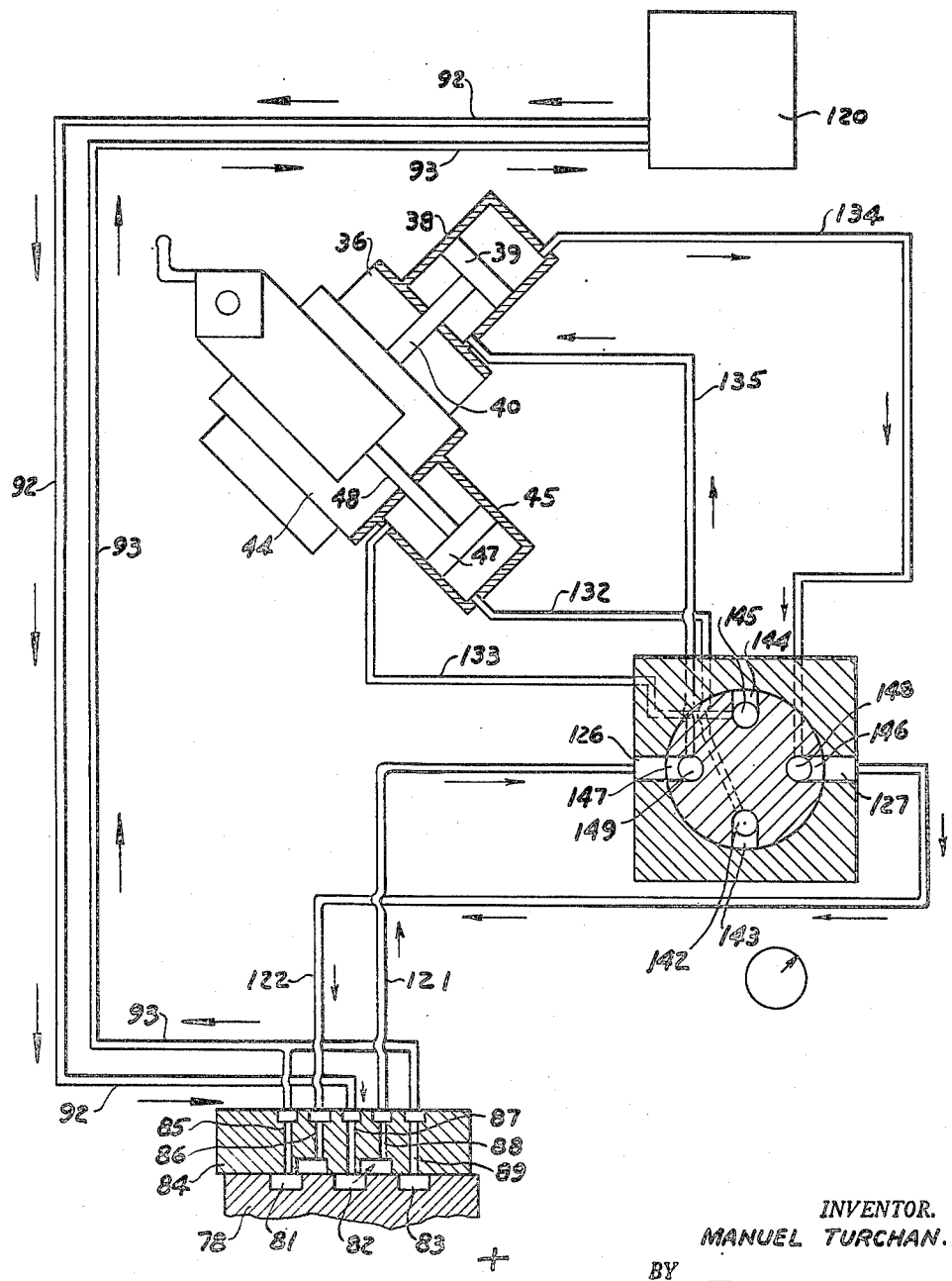

Patented June 24, 1952

2,601,345

UNITED STATES PATENT OFFICE 2,601,345

TRACER-GUIDED REPRODUCING MACHINE

Manuel Turchan, Dearborn, Mich.

Application December 27, 1948, Serial No. 67,469

9 Claims. (Cl. 82—14)

My invention relates to a new and useful improvement in a tracer-guided reproducing machine adapted for reproducing on a work piece the form and shape of a pattern or master over which a tracer is adapted to travel. These types of machines are either mechanically operated, electrically operated, or hydraulically operated; and in the present invention I have indicated the machine as being hydraulically operated in part, but it will be obvious from the description that other means of operation may be resorted to instead of the hydraulic mechanism set out. In machines which are tracer-guided or tracer-controlled, difficulty is encountered in making an undercut, as in most types of tracer-operated machines, it is impossible to make an undercut where it is necessary to cut to the right and to the left, or to cut in and to cut out. It has also been experienced that while it is common to reproduce by cutting to the right or to the left, it is impossible to have a tracer-controlled machine operate, under conventional types of construction, in such a manner that it may cut, in reproducing on the work piece the form of the pattern or template, both to the right and to the left at the appropriate times. It is an object of the present invention to provide a reproducing machine in which such cutting may be effected.

It is another object of the invention to provide a plurality of slides on which the cutting tool is mounted and which may slide, selectively, at various angles relatively to each other.

It is another object of the present invention to provide in a working machine a traveling slide carrying a pair of slides movable relatively to the traveling slide and so arranged and constructed that one may move in a path of travel angularly to the traveling slide in the direction of its travel, and the other may move angularly to the slide in a direction opposed to the direction of movement.

It is another object of the present invention to provide a plurality of slides so arranged and constructed that when one of the slides is moved, all of them are moved, and when some of the slides are moved, some of the slides remain stationary, thus determining the resultant path of travel of the cutting tool which is carried on one of the slides.

Another object of the invention is the provision in a machine of this type of a plurality of slides having hydraulic supporters or mechanism for moving the slides selectively and so arranged and constructed that the direction of movement may be varied depending upon a position of a control valve.

Another object of the invention is the provision of a reproducing mechanism particularly adapted for mounting on machines having slidable carriages such as the carriage of a lathe, and provided with tool-carrying slides so arranged that the tool may be moved relatively to the carriage angularly in one direction and angularly in another direction selectively.

Other objects will appear hereinafter.

It is recognized that various modifications and changes may be made in the detail of structure illustrated without departing from the invention, and it is intended that such shall be embraced within the scope of the claims which form a part hereof.

Forming a part of this specification are drawings in which,

Fig. 1 is a fragmentary perspective view of a lathe, showing the invention applied, Fig. 2 is a fragmentary top plan view of a lathe, showing the invention applied, Fig. 3 is a diagrammatic view illustrating the invention, Fig. 4 is a side elevational view of the view shown in Fig. 3, Fig. 5 is an end elevational view of Fig. 4, Fig. 6 is a diagrammatic view of the hydraulic circuit used in the invention, Fig. 7 is a fragmentary sectional view taken on line 7—7 of Fig. 3, Fig. 8 is a fragmentary sectional view taken on line 8—8 of Fig. 3, Fig. 9 is a longitudinal central sectional view through the tracer mechanism used in the invention, Fig. 10 is a diagrammatic view of the hydraulic circuit used in the invention with portions of the tracer valve and the changeover valve shown in section, Fig. 11 is similar to Fig. 10, but with the valve element in the changeover valve rotated 90 degrees from the position shown in Fig. 10.

Fig. 12 is a sectional view taken on line 12—12 of Fig. 3,

Fig. 13 is a fragmentary sectional view taken on line 13—13 of Fig. 9.

Figure 15:
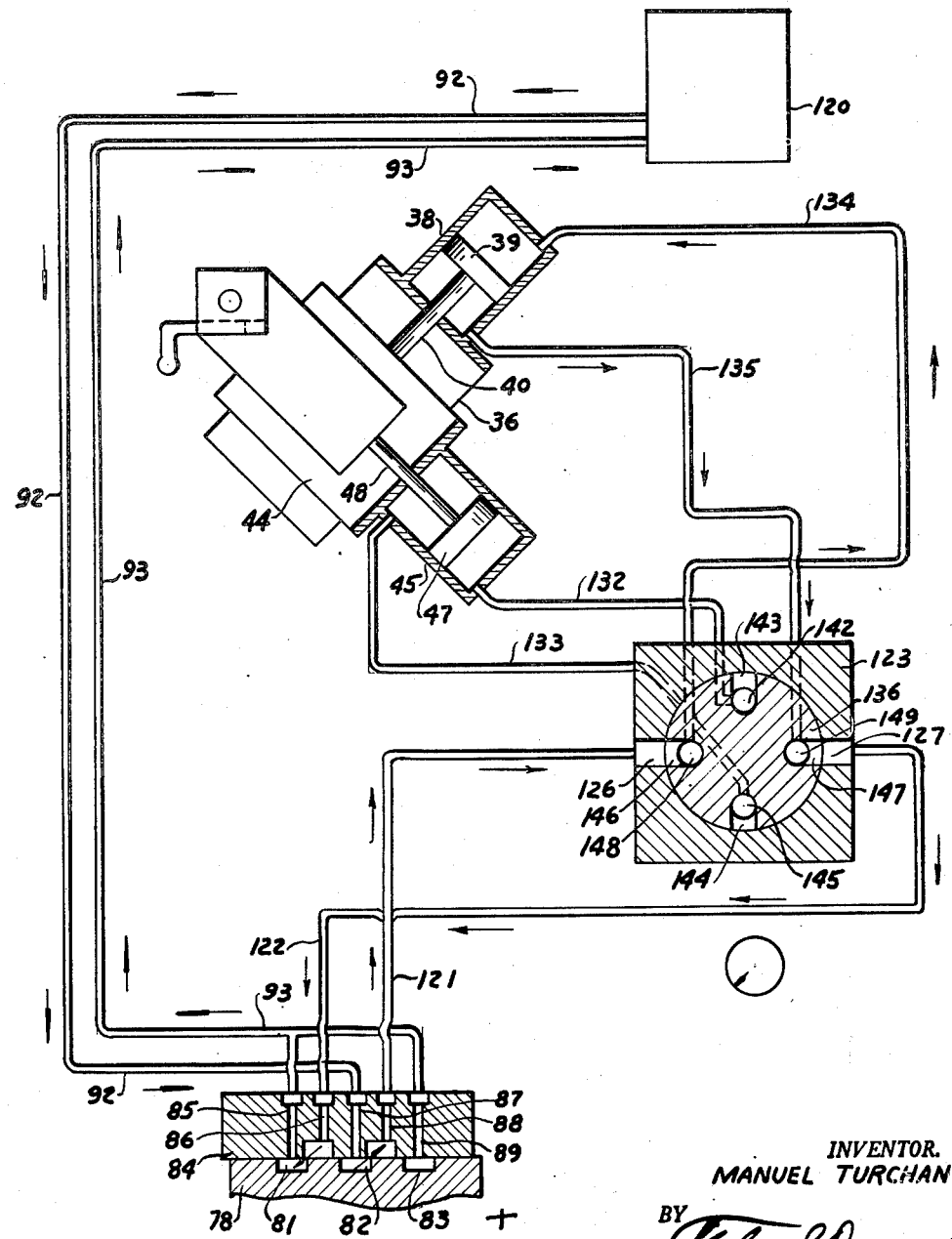
Fig. 15 is a diagrammatic view similar to Fig. 11 and also similar to Fig. 14, but with the changeover valve rotated 90 degrees clockwise.

14, but with the changeover valve rotated 180 degrees,

Fig. 17 is a diagrammatic view similar to Fig. 15, but with the changeover valve rotated 180 degrees.

Figure 1:
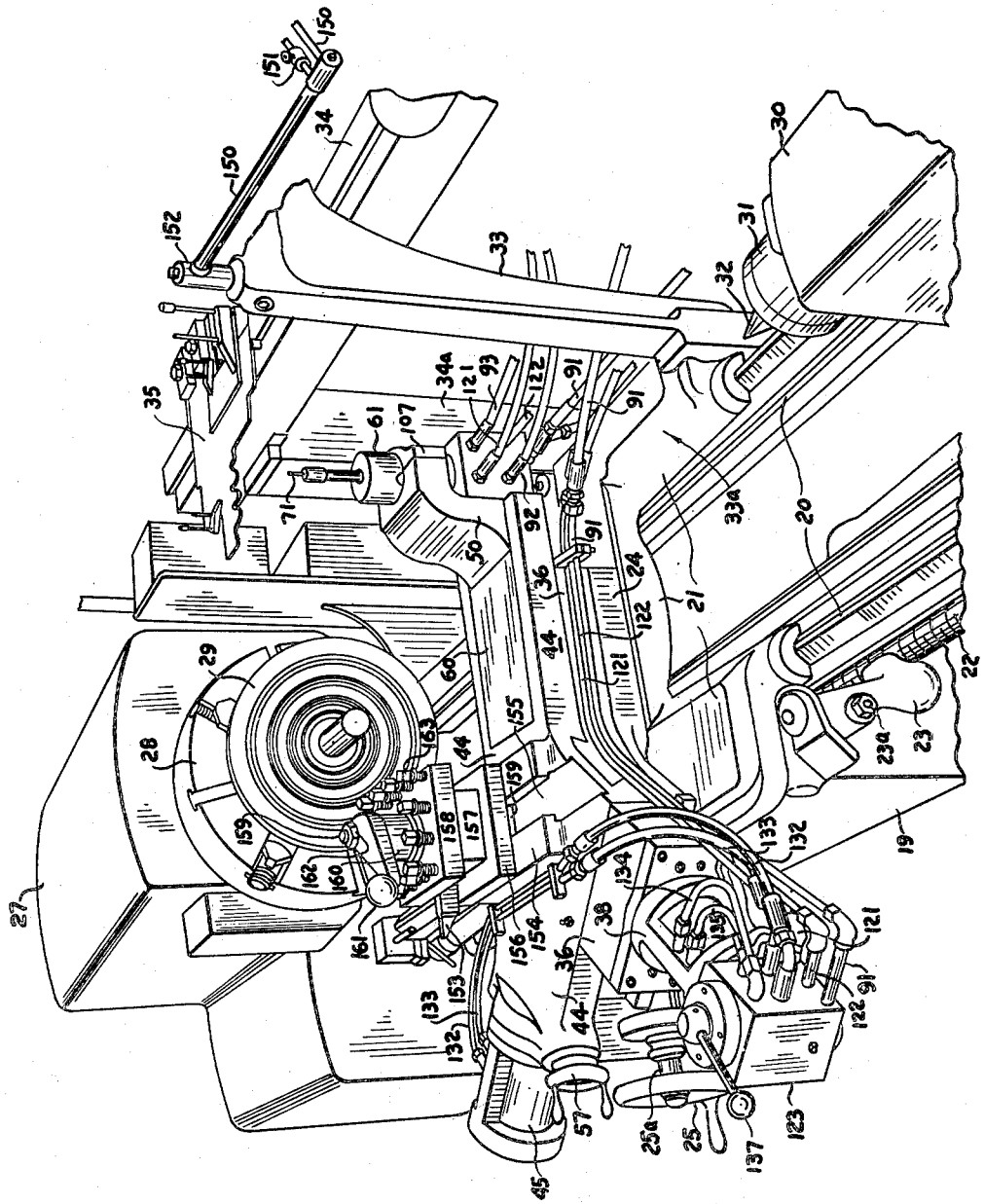

Referring to the drawings, a lathe bed 19 is shown in Fig. 1, upon which are positioned parallel spaced guideways 20 adapted to slidably support the lathe carriage 21. A suitable power-operated lead screw 22 is provided, which is arranged in threaded engagement with a suitable lead nut carried by the nut support 23, which depends from said carriage, being secured thereto by the nut 23a. Lead screw 22 is rotatable in one direction or the other and, being in threaded engagement with the lead nut, is adapted to effect reciprocal traversing movements of the carriage 21 on the guideways 20.

Lower cross-slide 24, Figs. 7 and 8, is slidably positioned upon the carriage 21 and is adapted to transverse adjustment thereon. The carriage 21 includes the dovetail 26 arranged transversely of its direction of feed movement, said dovetail cooperatively projecting within a corresponding dovetail recess formed on the under surface of the lower slide 24, a suitable gib 27 being interposed.

Transverse adjustment of the lower slide 24 may be effected manually by manual rotation of the hand wheel 25, which effects rotation of the lead screw shaft 25a shown in Fig. 1. Said lead screw is rotatably journaled through a portion of the carriage 21 and threadably engages a feed nut carried by the lower slide 24, which is not shown but which operates in the conventional manner for permitting manual transverse adjustments of the lower slide 24 with respect to the carriage 21.

Referring to Fig. 1, there is shown a conventional rotatable headstock 28 upon which is positioned the work piece 29. The bed 19 also carries a tailstock 30 at its opposite end, from which inwardly projects the support 31 for the tailstock center 32, which is employed when a work piece is supported between headstock 28 and the tailstock 30. As shown in Fig. 1, however, the tailstock 30 is not employed as the work piece 29 is positioned entirely upon the headstock 28.

The upstanding bracket 33 is secured to carriage 21 for movement therewith, said bracket including a conduit and pipe connection for lubricating carriage 21, the details of which will be described hereafter.

A suitable template support 34 is mounted upon the lathe bed 19 upon the upstanding template supporting pillars 34a, one of which is shown in Fig. 1 at the left end of the template support 34. Template 35 is adjustably secured upon the template support 34 for engagement with the tracer tip of the tracer mechanism in the manner hereafter described in detail.

The cross-slide 24, as shown in Figs. 7 and 8, has slidably and adjustably mounted thereon the angularly-arranged center slide 36, which in the present embodiment is positioned at an angle of 45 degrees to the longitudinal axis of the lower 45 cross-slide 24. This slide 36, also shown in Fig. 3, is secured to the hydraulic cylinder 38 for movement therewith in the manner hereafter described. Piston 39 is positioned within the hydraulic cylinder 38, said piston having a piston rod 40 whose outer end is secured at 41 to the lower slide 24, as indicated in Fig. 8. Consequently, it appears that reciprocal movement of the hydraulic cylinder 38 with respect to the piston 39 will effect reciprocal movement of the center slide 36.

Angularly arranged dovetail 43 projects upwardly from lower slide 24 and extends within a correspondingly-shaped dovetail recess 43a formed within the lower surface of the center slide 36, there being a suitable gib 43b interposed. It will be noted that the dovetail 43 also extends in a direction at an angle to the longitudinal axis of lower slide 36, said angle in the present embodiment being preferably 45 degrees.

Referring again to Figs. 7 and 8, an angularly extending top slide 44 is slidably positioned upon the center slide 36 and is arranged at approximately a 90-degree angle thereto. It follows further that the top slide 44 is arranged at an angle to the longitudinal axis of the cross-slide 24 which in the present embodiment is 45 degrees.

The top slide 44 has an extension upon the end of which is secured the hydraulic cylinder 45 for effecting reciprocal movement of the said top slide. Stationary piston 47 within cylinder 45 has a piston rod 48 which projects through the casing of the cylinder 45 and is secured at its outer end to the center slide 36 at the point 49. Consequently, reciprocal movements of the cylinder 45 with respect to the piston 47 will effect corresponding reciprocal movements of the top slide 44.

As shown in Fig. 8, there is an upstanding dovetail projection 46 positioned within a correspondingly-shaped dovetail opening 46a, there being a suitable gib interposed. It follows that the top slide 44 is reciprocally slidable upon the center slide 36 in a direction at an angle to the longitudinal axis of the lower or cross-slide 24.

Referring to Figs. 3, 7, and 8, it will be seen that the lower cross-slide 24 is adapted for in-and-out adjustments transverse to the direction of movement of the carriage 21, said adjustments being effected by the hand wheel 25 shown in Fig. 1. When so adjusted, either inwardly or outwardly, it will be seen that the center slide 36 as well as the top slide 44 will similarly be adjusted inwardly or outwardly. The center slide 36 is adapted to reciprocal movements at an angle to the direction of movement of the carriage 21 under the control of the hydraulic cylinder 38. When so adjusted it will be seen that not only is the slide 36 adjusted, but also the slide 44 which is mounted thereon. Top slide 44, as shown in Fig. 7, is also adapted to reciprocal movement under the control of the hydraulic cylinder 45. However, it will be seen that reciprocal movement of the top slide will be separate and independent of the center slide 36 as well as the lower slide 24.

It is apparent from Figs. 1 and 3 that the two hydraulic cylinders 38 and 45 are arranged at an angle to each other which in the present embodiment is an angle of 90 degrees. This follows from the fact that each of the slides 36 and 44 respectively are arranged at acute angles to the longitudinal axis of the lower or cross-slide 24, which in the present embodiment is an angle of 45 degrees.

Carriage 21 is adapted for reciprocal movement in one direction or the other upon the guideways 20 under the control of the rotatable lead screw 22. The lower cross-slide 24 is adapted for transverse manual adjustment in and out under the control of the hand wheel 25. The center slide 36 is reciprocally mounted upon the lower slide 24 and is adapted to angular reciprocal movement on said lower slide under the control of the hydraulic cylinder 38. Furthermore, the top slide 44 is slidably positioned on the center slide 36 with its longitudinal axis arranged substantially at 90 degrees to the longitudinal axis of the slide 36. The top slide 44 is reciprocally adjustable upon the slide 36 under the control of the hydraulic cylinder 45.

Referring to Figs. 1 and 3, top slide 44 is bifurcated and provided with guideways 52, upon which is slidably positioned the supporting plate 51 which projects from the upright supporting bracket 50. The slide 51 has a recess 53 within which is secured the nut 54 in threaded engagement with the manually rotatable lead screw 55. Said lead screw has a shaft 56 with a hand wheel 57 at its outer end for effecting in-and-out adjustment of the tracer-supporting bracket 50–51.

As shown in Fig. 1, the hand wheel 57 is positioned adjacent the left end of the top slide 44, there being a suitable formation therein for supporting the outer end of the lead screw shaft 56. The inner end of said shaft is journaled and supported within the bearing 58, which is secured within a corresponding recess 59 formed within top slide 44. Consequently, manual rotation in one direction or the other of the hand wheel 57 will effect corresponding in-and-out adjustments of the tracer bracket 50—51.

As shown in Figs. 1 and 4, a suitable cover plate 60 is suitably secured upon the top slide 44 above and in spaced relation to the inwardly and outwardly adjustable slide 51. This cover plate 60 has been removed from the plan view of Fig. 3 for clarity.

The upright tracer barrel 61 is positioned and secured within the bracket 50 carried upon the top slide 44, within the upper end of which is secured the ball race 62 with the angularly inclined surfaces 65. There is a corresponding circular ball support 63 carrying the ball bearings 64 for cooperation with the ball race 62 and the inclined surfaces 65, the balls 64 engaging in a groove formed in the support 63. The upright tracer arm 66 is centrally positioned within the tracer barrel 61 and has secured thereto intermediate its ends the ball support 63, as shown in Fig. 9, with the upper end of the tracer arm 66 projecting upwardly and outwardly from said tracer barrel.

A hollow cap 67 is suitably secured to the tracer arm 66 upon the outside of the tracer barrel 61, said cap having an annular flange whose interior diameter is greater than the exterior diameter of barrel 61, said flange projecting downwardly around the upper end of said barrel.

The adjustable hollow presser ring 68 is threadably positioned within the upper end of the tracer barrel 61, its inner surface in cooperative engagement with the ball race 62, there being a suitable locking ring 69 provided for effectively securing element 68 in the desired adjusted position.

It will be noted that the tracer arm 66 is secured to the ball support 63 for movement in unison with the balls 64 carried by support 63 adapted for cooperative engagement with the inclined surface 65 on the ball race 62.

A central longitudinal slot 70 is provided within the upper end of the tracer arm 66 and is adapted to receive the adapter 71a, within which is positioned tracer tip 71. A knurled nut 72 has a central opening through which the tracer tip 71 extends, said nut being threadably engaged with the outer end of the tracer arm 66 to effectively secure the adapter 71a within the end of said tracer arm. A suitable transverse slot 73 is provided adjacent the outer end of the tracer arm 66 giving access to the slot 70 within said tracer arm to facilitate removal of the tracer tip supporting adapter 71a.

As shown in Fig. 9, a semi-spherical opening 74 is formed centrally within the lower end of the tracer arm 66 for cooperatively receiving the spherical ball 76, said ball extending within a conically-shaped opening 77 in the control valve 78 whereby any transverse or axial movement of the tracer tip 71 will be transmitted to the control valve 78 to function in the manner hereinafter set out.

As shown in Fig. 1, the tracer tip 71 is adapted to engage the surface of the template 35, said tracer tip from time to time receiving lateral thrusts, which lateral thrusts are transmitted to the tracer arm 66 and to the balls 64. A lateral pressure exerted upon the tracer tip 71 has a tendency to cause the balls 64 carried by the tracer arm to ride downwardly on the inclined surfaces 65, with the result that the tracer arm 66 will move downwardly in a direction substantially parallel to the longitudinal axis of the tracer barrel 61, which movement of the tracer arm 66 is adapted through the ball 76 to effect downward movement of the control valve 78 controlling the flow of pressure fluid.

The control valve 78 has formed in its outer cylindrical surface the three annular openings 81, 82, and 83.

The sleeve 84, which slidably receives control valve 78, has an annular flange at its upper end which extends into and threadably engages with the lower end of the tracer barrel 61, said sleeve having a plurality of fluid passages 85, 86, 87, 88, 89, and 90 formed therein.

As shown in Fig. 9, the drain conduit 91 is joined to the tracer valve housing 106, which has a suitable passage therein establishing communication between the drain conduit 91 and the passage 90 formed within the valve sleeve 84.

As the control valve 78 is slidably positioned within the valve sleeve 84, it follows that there will be some oil seepage gravitating downwardly and collecting within the annular chamber 97. In view of the connection between the chamber 97 and the drain 91 by means of the passage 90, it is clear that this oil is withdrawn from the tracer housing as it collects within the collecting chamber 97.

Figure 6:
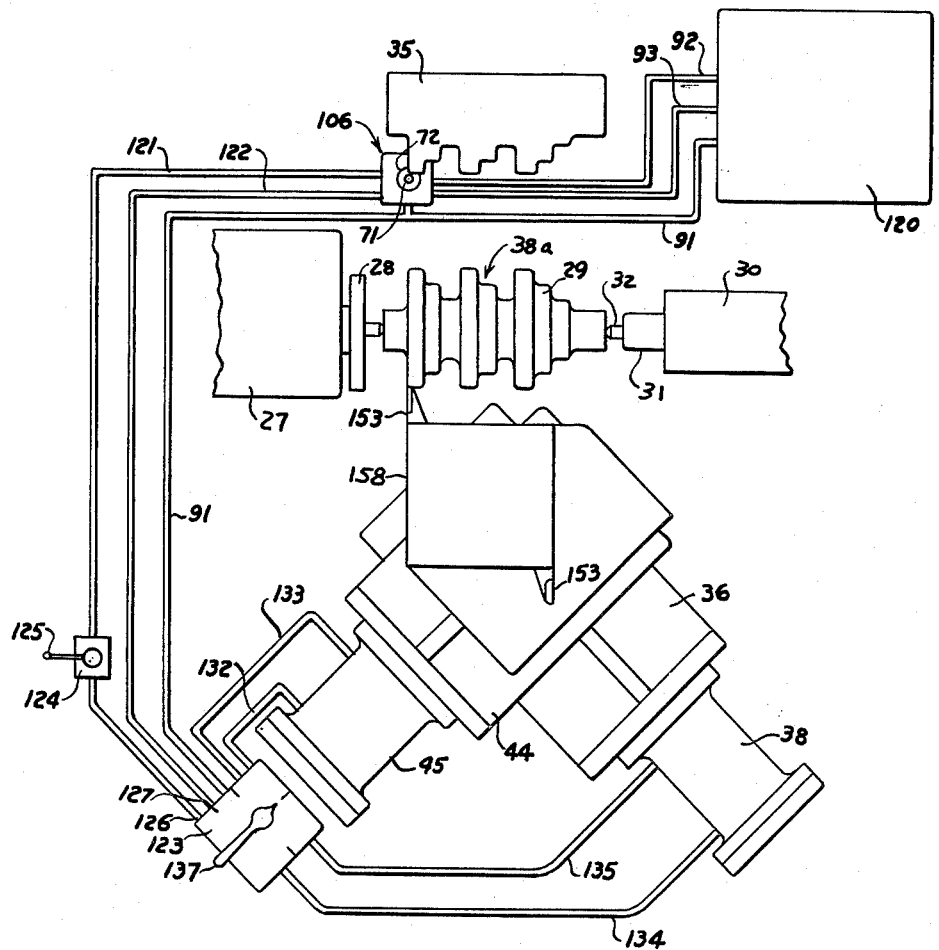

Referring to Fig. 6, a hydraulic power unit is diagrammatically indicated as element 120, said unit including a suitable fluid storage sump as well as a hydraulic pump in communication therewith for supplying pressure fluid to the fluid delivery pipe 92. This delivery pipe 92 extends from the hydraulic unit 120 and is joined at its other end to the tracer housing 106. There is also an exhaust conduit 93 to connect the tracer housing 106 and the hydraulic unit 120 for transmitting exhaust fluid from the cylinders back to the fluid storage sump within the said hydraulic unit.

As shown in Fig. 9, the fluid pressure delivery conduit 92 is joined to the passage 88 by the intermediate passage 92a indicated by dotted lines in the drawing. It will be seen that pressure fluid supplied from the conduit 92 is thus directed to the passage 88 and, depending upon the positioning of the control valve 78, will be transmitted to either of the cylinder supply passages 87 or 89, which respectively communicate with passages 118 and 119 shown in dotted lines in Fig. 9 and being arranged within the tracer housing 106.

Referring to Fig. 6, it is seen that there is a pair of conduits 121 and 122 which join the tracer housing 106, said conduits being respectively joined to the passages 118 and 119 within the tracer housing 106 (Fig. 9).

Again referring to Fig. 9, a suitable cover 94 threadably extends within tracer housing 106 to form a closure for the lower end thereof. A suitable bearing 95 is positioned within the lower end of the cap 94 adjacent the central upright annular flange 96, which has a central opening to slidably receive the valve stem 98. Said hollow upright projection 96 performs the further function of preventing any oil seepage which collects within the chamber 97 from escaping down the stem 98, said element 96 cooperating with the chamber 97 to provide a closure for retaining this seepage.

Valve stem 98, secured at its upper end to the fluid control valve 78, slidably extends through the hollow sleeve formation 96 and projects below cap 94 of the tracer housing 106. Disc 99 is positioned adjacent the lower end of the valve stem 98 and is secured thereon by the nut 100, as shown.

The transverse slot 102 formed within the tracer arm 66 intermediate its ends and within the tracer barrel 61 is adapted to slidably receive the transverse stabilizer pin 103, which is eccentrically mounted at 104 at its ends within the spaced ball bearings 105 secured within the tracer barrel 61. The stabilizer pin 103 is intended to slidably regulate the vertical reciprocal movements of the tracer arm 66, at the same time preventing rotation thereof.

A coil spring 101 extends around the upright projection 96 which forms a part of the cap 94 with its opposite ends interposed between bearing 95 carried in the cap 94 and the lower end of the control valve 78. Consequently, it is apparent that the control valve is supported upon the coil spring 101 and is thus in a floating condition within the valve sleeve 84. The initial positioning of the control valve 78 within said sleeve may be controlled by manual adjustment of the cap 94 regulating the tension within the coil spring 101. Thus, it is seen that upward movement of the control valve 78 is effected by the coil spring 101, whereas lateral pressure upon the tracer tip 71 operating through the tracer arm 66 controls the downward movement of the control valve 78 against the tension of the spring 101.

The tracer barrel 61 is supported in an upright position within an opening in the bracket 50 and is adjustably secured in position by the removable plate 107 secured thereto by the screws 108.

Still referring to Fig. 5, there is a pivotal arm 109 pivoted at 111 to the lower end of the tracer valve housing 106, one end of said arm 110 being bifurcated at 109 to cooperatively receive a portion of the disc 99 on the valve stem 98. The opposite end of the link 109 is pivotally joined at 112 to the vertically movable control shaft 113.

Said shaft projects upwardly into the housing 114 and carries at its upper end the circular disc 115 in cooperative engagement with the manually rotatable cam 116.

As viewed in Fig. 4, it will be seen that the housing 114 is secured to and carried by the control valve housing 106 by the screws 116a. The manually rotatable shaft 117, which carries the cam 116, extends from the housing 114 and has at its outer end the manually operated handle 119. A suitable coil spring 118 is positioned within the housing 114 interposed between the lower end thereof and the under surface of the disc 115 upon the control shaft 113. By this construction, it is apparent that manual rotation in one direction or the other of the handle 119 will effect a corresponding rotary movement of the cam 116; said cam in turn will cause downward movement of the control arm 113 against the action of the spring 118, and this downward movement in turn will effect pivotal movement of the link 109 to cause upward movement of the valve stem 98. It follows that moving the handle 119 in the opposite direction will cause or permit the control arm 113 to be moved upwardly under the action of the spring 118, and in that case the link 109 will be pivoted in a clockwise direction, causing downward movement of the valve stem 98. Thus, there is shown in Figs. 4 and 5 a manual control for the control valve 78 within the tracer housing 106. This manual control is used primarily in setting up the tracer mechanism and securing its proper relationship with the pattern before the machining operation. This manual control is also useful for controlling movement of the cylinder under tracer control at the end of the turning operation.

Now referring to Fig. 6, it is seen that the two conduits 121 and 122 which project from the tracer valve housing 106 are joined to the changeover valve 123, there being a shut-off valve 124 interposed in the line 121 and controlled by the arm 125. Depending upon the operation of the tracer valve within the tracer housing 106, either of the lines 121 or 122 will conduct pressure fluid to one end or the other of either of the two cylinders 38 or 45, depending upon the positioning of the rotatable valve element within the changeover valve 123. It follows further that either of the other of the two conduits 121 or 122 will conduct exhaust fluid back from the cylinder under tracer control back to the tracer housing and thence back to the hydraulic unit through the exhaust line 93.

As shown in Fig. 6, the conduit 121 is joined to the changeover valve 123 at the point 126, whereas the conduit 122 is joined to said changeover valve at the point 127.

Referring now to Fig. 10, which is a diagrammatic view illustrating the various pipe connections between the hydraulic unit 120 and the tracer valve sleeve 84 as well as the connections between the tracer valve sleeve 84 and the changeover valve housing 123. The changeover valve is shown in section for clarity. There are also shown two hydraulic cylinders 38 and 45 with various pipes connecting the respective opposite ends of said cylinders and outlet ports of the changeover valve 123.

There is a plurality of outlet ports 128, 129, 130, and 131 in spaced relation formed within the changeover valve housing 123. The conduit 132 interconnects the outlet port 128 and one end of the hydraulic cylinder 45. A conduit 133 interconnects the opposite end of the cylinder 45 and the outlet port 129. The conduit 134 interconnects the outlet port 130 and one end of the cylinder 38, whereas the other conduit 135 connects the other end of cylinder 38 with the outlet port 131 in the changeover valve housing 123. Thus the outlet ports 128, 129, 130, and 131 are respectively joined by the conduits 132, 133, 134, and 135 with the opposite ends of the hydraulic cylinders 45 and 38.

There is a manually rotatable valve element 136 positioned within the changeover valve housing 123, said valve element being rotated to the desired position in the manner hereinafter explained by the control arm 137, which is suitably joined to the rotatable valve element 136 and which is positioned on the outside of the changeover valve housing 123.

As previously described, a supply conduit 121 is joined to the fluid opening 126 in the changeover valve, and at the same time the other conduit 122 is joined to the fluid opening 127 therein. Depending upon the positioning of the valve element within the tracer valve housing, that is, within the valve sleeve, one of the two conduits 121 or 122 will be delivering pressure fluid to the changeover valve housing, and the other will be conducting exhaust fluid therefrom back to the tracer housing for subsequent exhausting to the hydraulic unit and the sump therein. In Fig. 10, it will be assumed that the tracer control valve 78 is moved to the position shown so that pressure fluid from the hydraulic unit will be supplied to the changeover valve through the conduit 121, and in that case the other conduit 122 will be conducting exhaust fluid from the changeover valve to the tracer valve housing.

The rotatable valve element 136 within the changeover valve 123 has a plurality of spaced annular openings 138, 139, 140, and 141, which are shown in the sectional portion of Fig. 10, adapted for communication with the fluid ports 128, 129, 130, and 131 respectively.

There are four parallel spaced, non-communicating channels of varying length arranged within the valve element 136, any two of which, depending upon the positioning of the valve element 136 within housing 123, are adapted to establish communication between the opposite ends of one of the two cylinders 38 or 45. As shown in Fig. 10, there is a long passage 142 in communication at its upper end with the annular opening 138, whereas its lower end is in communication with the fluid inlet port 143. From the initial assumption that pressure fluid is being supplied through the conduit 121, it will appear that said pressure fluid will be delivered to the opening 126 for communication through the changeover valve housing 123 to the inlet opening 143, and then through the long conduit 142 to the annular opening 138, through the housing 123 to the cylinder port 128, and thence through the conduit 132 to the outer end of the hydraulic cylinder 45.

A second inlet opening 144 is shown at the lower end of the rotatable valve element 136 opposite from the inlet port 143. It will be seen from the drawing in Fig. 10 that said inlet port 144 is in communication with the opening 127 in housing 123, and this in turn communicates with the fluid exhaust pipe 122. There is a second upright passage 145 arranged in spaced relation from the passage 142 with its upper end in communication with the annular opening 139 and its lower end in communication with the port 144. It will be noted, and as above described, the annular opening 139 is connected with the cylinder port 129 and through the conduit 133 joins the inner end of the hydraulic cylinder 45. This represents one positioning of the valve element 136 within changeover valve 123, and as above described, pressure fluid is being supplied through the pipe 132 to the outer end of 45. Exhaust fluid from cylinder 45 is being returned through the conduit 133 back to the cylinder port 129, and through the passage 145, port 127 and the conduit 122, back to the tracer valve sleeve 84, thence exhausted back to the hydraulic unit 120.

It will be apparent if we continue with the assumption that pressure fluid is being supplied through the pipe 121, that the rotatable valve element 136 may be rotated 180 degrees from the position shown in Fig. 10. In this case, port 144 will be in communication with the port 126, with the result that the pressure fluid supplied from pipe 121 will be conducted through port 126, opening 144, passage 145, annular opening 139, cylinder port 129, and conduit 133, to the opposite end of the hydraulic cylinder 45; and it will be noted that when the rotatable valve element 136 is rotated 180 degrees from the position shown in Fig. 10, that the pressure fluid supply is reversed from one end of said hydraulic cylinder to the other, and likewise the exhausts connected to said cylinder have been reversed.

From the above description, it is apparent that the cylinder 45 is the only cylinder that is under tracer control, and that the cylinder 38, in view of its connection with the changeover valve, is receiving no fluid and is entirely inactive.

Referring to Fig. 11, the changeover valve 123 is, however, adapted for changing the fluid pressure connections in such a fashion that tracer controlled fluid will be supplied and exhausted to one end or the other of the hydraulic cylinder 38. As shown in Fig. 11, the rotatable valve element 136 has an additional two fluid inlet or exhaust ports 146 and 147, and when the rotatable valve element 136 is rotated 90 degrees from position shown in Fig. 10, the port 146 will be in communication with the port 126 of the changeover valve housing. Continuing with the original assumption that pressure fluid is being supplied through the conduit 121, it should follow that said pressure fluid will then be made available through the port 126 to the opening 146 at the lower end of the rotatable valve element 136. A third spaced channel 148 is found within the rotatable valve element 136 in spaced relation to the other two channels 142 and 145. The upper end of the channel 148 is in communication with the annular opening 140, whereas the lower end of the channel 148 is in communication with the inlet or exhaust port 146. A fourth channel 149 in parallel spaced relation to the other three channels 142, 145, and 148 is also formed within the rotatable valve element 136, the upper end of the passage 149 being in communication with the annular opening 141. The lower end of the passage 149 is in communication with the fluid inlet or exhaust opening 147 formed within the lower end of the rotatable valve element 136.

Consequently, as shown in Fig. 11, the valve element 136 has been rotated 90 degrees from the position shown in Fig. 10, and pressure fluid through the conduit 121 is being supplied through the passage 148 to the annular opening 140 and thence to the cylinder port 130. From cylinder port 130, the pressure fluid is conducted through the pipe 134 to the outer end of the hydraulic cylinder 38. At the same time, exhaust fluid from cylinder 38 is returned through the pipe 135 into the cylinder port 131. There is shown in Fig. 11 the exhaust fluid flowing into the opening 141 and through the passage 149, thence to the port 147, and returning to the tracer valve through the conduit 122. Consequently, from the position of the valve element shown in Fig. 11, pressure fluid from the pipe 121 is conducted through the channel 148 to the outer end of the hydraulic cylinder 38. At the same time, exhaust fluid from said cylinder returns to the changeover valve and through the passage 149 returns to the tracer valve through the pipe 122.

It will be apparent also that connections to the opposite ends of the cylinder 38 may be reversed by rotating the rotatable valve element 136 180 degrees from the position shown in Fig. 11. In this case, it will be apparent that a pressure fluid supplied through the pipe 121 will be delivered through the short channel 149 to the inner end of the hydraulic cylinder 38, and exhaust from the opposite end of said cylinder will be returned through pipe 134 and through passage 140, and thence through the pipe 148, opening 146, and opening 127, back to the tracer valve through the pipe 122.

From an examination of Figs. 10 and 11, it appears that tracer controlled fluid from the tracer valve is supplied through either of the pipes 121 or 122, depending upon the positioning of the valve element within the tracer in response to the tracer tip engaging the surface of the pattern, so that pressure fluid is supplied through the pipes 121 or 122 to the changeover valve housing 123. Said changeover valve has a pair of inlet openings 126 and 127 conducting pressure fluid from either of the pipes 122 or 121 to the interior of the changeover valve. The manually rotatable valve element 136 within the changeover valve has four inlet openings 143, 144, 146, and 147 formed therein and spaced at 90 degrees from each other. In the position of the rotatable valve element 136 in Fig. 10, only the inlet openings 143 and 144 are effective, said openings being respectively in communication with the inlet or exhaust openings 126 and 127. It is only when the rotatable valve element 136 is rotated 90 degrees to the position shown in Fig. 11, that the second two oppositely arranged ports 146 and 147 are in communication with the openings 126 and 127. Thus it is apparent that tracer control may be changed from one cylinder to the other.

Still referring to Figs. 10 and 11, it will be remembered that the initial assumption taken in connection with the description of said figures contemplated that pressure fluid was delivered from the tracer valve sleeve 84 to the conduit 121, whereas the other conduit 122 back to the tracer sleeve conducted exhaust fluid from the changeover valve. Referring more particularly to Fig. 10, and in view of the above description, it is apparent that with the setting of the rotatable valve element 136 within the changeover valve 123, as shown in Fig. 10, only the hydraulic cylinder 45 will be under tracer control. Whether pressure fluid will be supplied through the pipe 121 or through the pipe 122 will depend entirely upon the positioning of the valve element 78 within the tracer valve sleeve 84. If movement to the right of the valve sleeve 78 from a central position as shown in Fig. 9 is regarded as a movement caused by a positive displacement of the tracer tip 71 against the surface of the template, then it is apparent that a negative displacement of the tracer tip as where the tracer engages a depression in the template will cause a movement of the tracer valve 78 in the opposite direction, so that pressure fluid from the pipe line 92 from the hydraulic unit 120 is transmitted out from the tracer valve sleeve 84 to the pipe 122 and thence to the changeover valve at the inlet port 127. From the above description, it follows that exhaust fluid from cylinder 45 will be returned to the changeover valve and will return to the tracer valve through the exhaust pipe 121 for subsequent exhausting through the pipe 93 back to the hydraulic unit 120. In this case, if there is a negative displacement or such displacement as causes pressure fluid to be supplied through the pipe 122, it then follows that the pressure fluid will be supplied again to the hydraulic cylinder 45, as there has been no change in the rotatable valve element 136. However, pressure fluid will be supplied to the opposite end of the hydraulic cylinder 45. As originally described and as viewed in Fig. 10, the pressure fluid was supplied through the pipe 121; said pressure was delivered to the outer end of cylinder 45 through the conduit 132. It consequently follows that with the valve changed to a different position so that pressure fluid is supplied through the pipe 122, then such pressure fluid will be delivered to the inner end of the cylinder 45 through the conduit 133.

From the above description, it is clear that with the changeover valve element 136 set in a particular position, the tracer is capable of regulating the reciprocal movement of one of the cylinders such as the cylinder 45 described. Movement of the tracer valve in one direction will supply pressure fluid to one end of the cylinder for moving it in one direction, and furthermore, movement of the tracer valve in a different direction will cause pressure fluid to be supplied to the opposite end of said cylinder for causing movement of said cylinder in the opposite direction.

It also follows from the previous description of Fig. 11, where the original assumption stated that pressure fluid was supplied through the pipe 121 and was conducted through the changeover valve to the outer end of the hydraulic cylinder 38, that if the tracer valve is moved to a different position from the position shown in Fig. 11, that is, a position to the left of what would be the central or neutral position of the tracer valve, in that case pressure fluid will be supplied through the pipe 122 and exhaust will return through the pipe 121. Therefore, it would follow that such pressure fluid so supplied through the pipe 122 would be delivered to the inner end of the hydraulic cylinder 38 through the pipe 135 and exhaust fluid from said cylinder would return through the pipe 134 through the changeover valve and return to the tracer housing through the pipe 121.

Consequently, in Fig. 11 it is also true that here the cylinder 38 is under tracer control and cylinder 45 is inactive. Furthermore, depending upon the movements of the control valve within the tracer, pressure fluid will be supplied through either of the pipes 121 or 122. Consequently, reciprocal movement of the hydraulic cylinder 38 can be effected.

By virtue of the construction of the changeover valve as set out in detail and the various pipe connections between said changeover valve and the tracer, it is quite clear that at no time can more than one cylinder be under tracer control. At that time, when one cylinder is under tracer control, the other cylinder is entirely inactive.

Referring to Figs. 10 and 11, as well as Fig. 1, it is contemplated during a reproducing operation where the tracer engages the surface of the template 35, that the carriage 21 will be fed continuously in one direction or the other along the ways 20. Feed movement of the carriage 21 is effected by the rotatable screw 22, which is indicated in Fig. 1. It is contemplated also that the carriage 21 may be moved along the ways 20 under hydraulic power. Lubrication may be supplied to carriage 21 through the pipe 150 shown in Fig. 1, there being a suitable hand valve 151 interposed in said pipe for controlling the flow of lubricant therethrough. The pipe 150 is joined to and in communication with the lubricant pipe 152 which is formed within the upright bracket 33 shown in Fig. 1.

Said bracket is secured to the extension 33a which forms a part of and is joined to the carriage 21.

Whether the carriage 21 (Fig. 1) is moved mechanically by the screw 22 or hydraulically makes little difference. It is contemplated that either of the cylinders 38 or 45 will operate simultaneously with the movement of the carriage 21 as it is fed along the ways 20 with movements of either of the cylinders 38 or 45 being controlled by the tracer.

The cross-slide 24 as indicated in Fig. 1 is operated manually by the hand wheel 25 and the shaft 25a. However, it is contemplated that the shaft 25a could be rotated mechanically or be power-driven. Whether the cross-slide is controlled or moved manually or under power, it is quite apparent that either of the two cylinders 38 or 45 may be operating under tracer control throughout feed movement of and simultaneous with the feed movement of the cross-slide 24. Thus, either cylinder may operate simultaneously with the movement of the cross-slide with either of such cylinders being under tracer control. Normally, when the cross-slide is being moved manually by the hand wheel 25 or by another suitable power means, the carriage 21 would be stationary.

In operation, moving from right to left of Fig. 1, the cutter 153 (not visible) may be said to be operating upon the front side of the work piece 29. The opposite side of the work piece may be termed the back side. Of the two cylinders 38 and 45 which may be termed hydraulic motors, it would appear that the cylinder 38 would be used for cutting the front side of the work piece, and the cylinder 45 would be employed for cutting the back side of the work piece or the back side of an under-cut. Consequently, it is possible by the present invention to reproduce over 360 degrees of the surface of the template in a particular work piece. The changeover valve 123 is adapted to determine which of the two cylinders will be under tracer control, and thereafter the tracer mechanism is so connected as to effect reciprocal movement of the particular cylinder which is to be controlled.

Fig. 10 of the drawings is a diagram of the pipe connections between the two cylinders 38 and 45 and the changeover valve 123 as well as the tracer valve 84. The movable valve element 78 which forms a part of the tracer is moved to the right from the neutral position of said valve element as shown in Fig. 9. This may be regarded as the position it would assume when the tracer is under a positive deflection, for example.

In Fig. 9 the tracer valve 78 is in a neutral position so that pressure fluid available through the pipe 92 from the hydraulic unit 120 is completely stopped and there is no flow of fluid through the tracer, as the position of the valve element 78 is such that passage 88 is completely blocked off.

Referring again to Fig. 10, it appears that tracer valve 78 has been moved to the position shown, which may be assumed to be a positive position, so that pressure fluid from the pipe 92 will flow through the passage 87 entering annular opening 82 so that fluid is now conducted to the outlet passage 88 and thence to the delivery pipe 121. As above described in detail, this pressure fluid is available to the outer end of cylinder 45 through the conduit 132.

As shown in Fig. 11, it will be seen that the tracer valve 78 is in the same position as in Fig. 10, so that pressure fluid is again supplied to the delivery pipe 121 for conduction to the changeover valve 123. However, it will be noted the rotatable element 136 within the changeover valve has been rotated 90 degrees from the position shown in Fig. 10 so that the tracer-controlled fluid is now delivered to cylinder 38 into the outer end thereof through the conduit 134 in the manner hereinbefore fully described.

Figure 14:
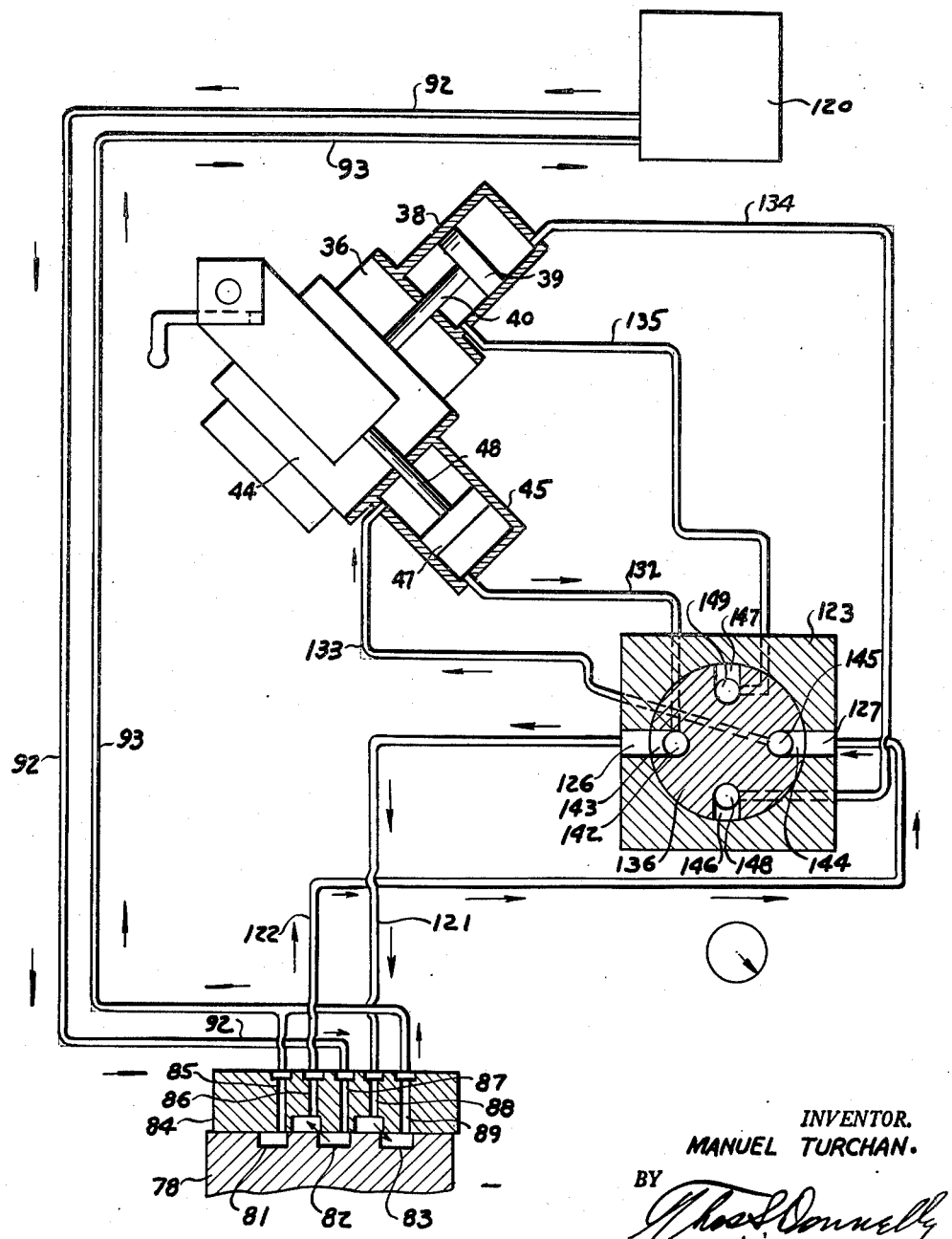
Fig. 14 is a diagrammatic view similar to Fig. 10, but with a tracer valve in a different position.

Referring to Fig. 14, which is substantially similar to Fig. 10 with the exception that the tracer-controlled valve 78 has been moved in the opposite direction from the neutral position shown in Fig. 9, and this would correspond to the negative position of the tracer, which has before been described. Furthermore, Fig. 14 differs slightly from the diagram shown in Fig. 10 inasmuch as for purposes of illustration there has been taken a transverse section of the changeover valve 123, whereas in Fig. 10 there was a longitudinal section thereof. However, it is apparent that the rotatable valve element 136 is in the same position with respect to its housing 123 in both of the Figures 10 and 14.

Referring to Figs. 10 and 14, as the tracer control valve 78 has been moved to the negative position shown, pressure fluid will be delivered through the pipe 122 now, instead of the pipe 121, conducting pressure fluid to the port 127 of the changeover valve. This pressure fluid is then delivered to the opposite end of the cylinder 45, i. e., the outer end, through the conduit 133.

In comparing Figs. 10 and 14, it is apparent that when the rotatable valve element 136 within the changeover valve remains unchanged, the movement of the tracer valve 78 to a positive position will conduct pressure fluid to the inner end of cylinder 45 through the conduit 132, whereas, and as shown in Fig. 14, when the tracer has assumed a negative position, pressure fluid will be delivered to the opposite end of cylinder 45 through the conduit 133. This means that for any given position of the rotatable valve element within the changeover valve, the tracer valve itself, depending upon its positioning, will regulate the reciprocal movement of one hydraulic cylinder such as the cylinder 45 above described.

In comparing Fig. 15 with Fig. 11, it is apparent that Fig. 15 is also a diagram of the various connections between the cylinders and the changeover valve as well as between the tracer. However, here also the rotatable valve element 136 is in the same position in both figures. Fig. 15, however, shows a transverse section of the changeover valve as contrasted with the longitudinal section thereof shown in Fig. 11 for illustration. Consequently, with the rotatable valve element 136 within the changeover valve in the same position, and with the tracer control valve 78 in the same position in Fig. 15 as in Fig. 11, it is clear that pressure fluid should be delivered in both instances to the outer ends of the cylinder 38 through the pipes 134, the exhaust returning from said cylinder through the conduits 135.

Fig. 15 may also be compared with Fig. 14, wherein it is seen that in Fig. 15 the rotatable valve element 136 has been rotated 90 degrees in a clockwise direction. This means that the tracer control which in Fig. 14 was to one end of the hydraulic cylinder 45 changed over to one end of the hydraulic cylinder 38.

Figure 16:
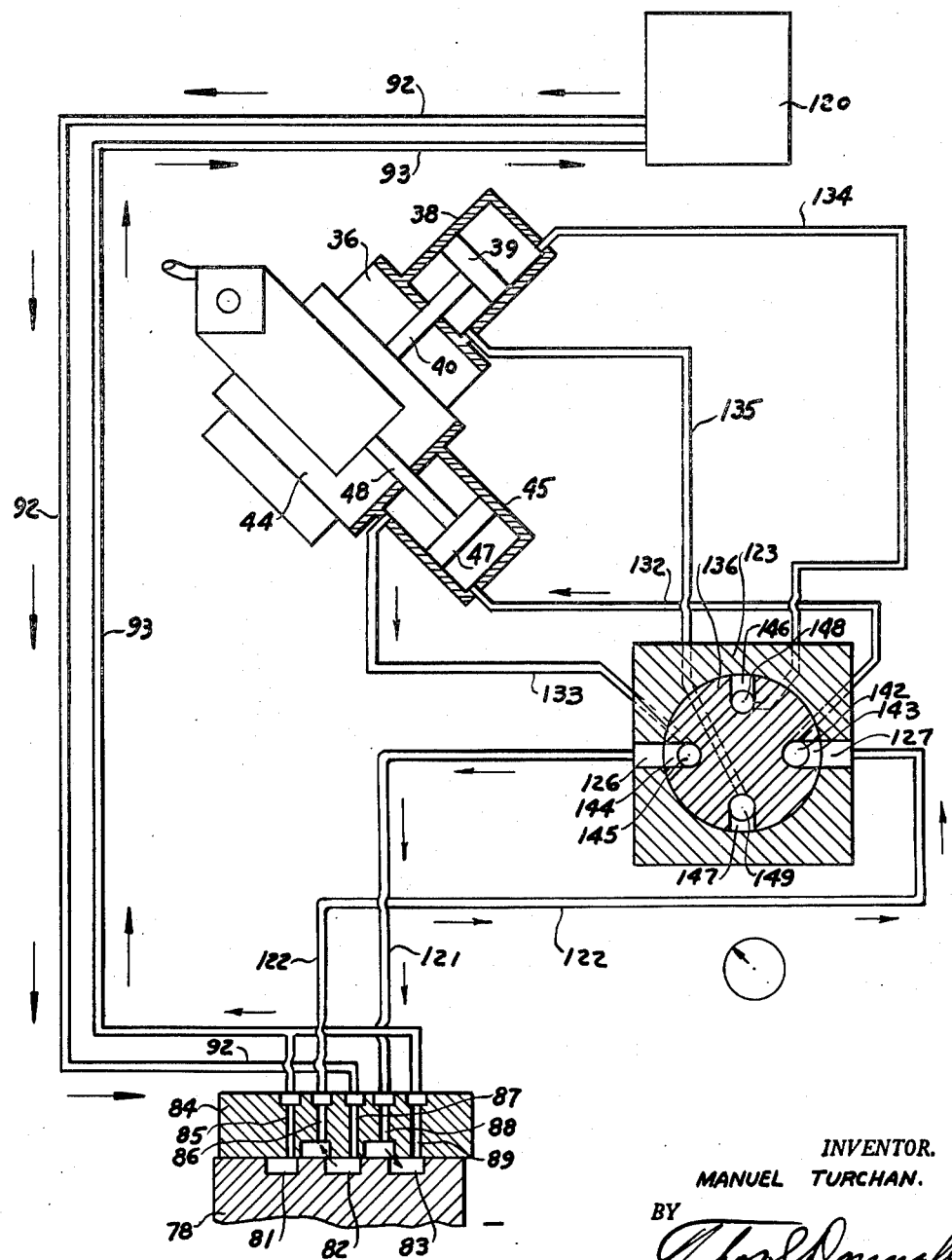
Fig. 16 is a diagrammatic view similar to Fig.

Fig. 16 in the drawings is also a diagrammatic illustration of the various connections between the cylinder, the changeover valve, and the tracer, and it is seen in comparing Figs. 14 and 16 that the tracer control valve element 78 is in a negative position and is to the left of the central, neutral position shown in Fig. 9, so that pressure fluid is supplied to the changeover valve through the conduit 122, with exhaust fluid returning from the changeover valve to the tracer through the conduit 121, in the manner fully described hereinabove. In comparing Figs. 14 and 16, it is clear that the tracer valve 78 is in the same position with respect to the valve sleeve in both of these figures. However, it appears that the rotatable valve element 136 within the changeover valve has been rotated in Fig. 16 180 degrees from the position shown in Fig. 14, with the result that the tracer control remains in the cylinder 45 but the negative positioning of the tracer control valve 78 in Fig. 16 causes pressure fluid to be supplied to the opposite end of the cylinder from that shown in Fig. 14. In other words, the effect of the negative positioning of the tracer valve element 78 upon a particular cylinder connected thereto may be reversed at any time by rotating the rotatable valve element 136 180 degrees from one position to the other. For example, tracing over the surface of a pattern on one side thereof, a negative positioning of the tracer arm will cause a particular cylinder to move in one direction, carrying the tracer and cutter toward the pattern and work piece respectively. Now, assuming it is desired to trace the opposite side of the pattern using the same arrangement of elements and there is also a negative deflection, it will be seen that in order that the tracer and cutter move toward the pattern and work piece respectively, it will be necessary for the cylinder under tracer control to move in the opposite direction. Consequently, by being able to rotate the rotatable valve element 136 180 degrees from one position to another, the control effect of the tracer valve 78 is reversed so that the negative positioning of the valve in one position of the changeover valve causes the cylinder to move in one direction, whereas when the changeover valve is rotated 180 degrees, the same negative positioning of the tracer valve will cause the cylinder under tracer control to move in the opposite direction. Consequently, it is possible to trace over 360 degrees of a template or pattern.

Referring to Fig. 17, it is seen that this figure, which is a diagrammatic view of the connections between the cylinders, the changeover valve, and the tracer, is substantially similar to the diagrammatic view shown in Fig. 15. It will be noted that the valve element 78 is in the same positive position in Fig. 17 as in Fig. 15. However, the rotatable valve element 136 in the changeover valve has been rotated in Fig. 17 180 degrees from the position shown in Fig. 15.

As shown in Fig. 15, cylinder 38 is under tracer control with pressure fluid being supplied to the outer end thereof through the pipe 134. It is noted also that cylinder 45 is inactive. Now referring to Fig. 17, the valve element 136 has been rotated 180 degrees so that tracer control still remains within the cylinder 38; however, the operative effect of the tracer control valve 78 is reversed and pressure fluid is now supplied to the opposite end of cylinder 38 through the conduit 135. From this it follows that at any time no more than one of the two cylinders 38 or 45 is under tracer control. With one particular position of the changeover valve, the tracer will control fluid depending upon the movement of the valve element 78 to either one end or the other of the cylinder under tracer control, with the other cylinder being inactive. Now, if the changeover valve is rotated 90 degrees from a particular position, it will be seen that, as fully explained, tracer control will be switched from one cylinder to the other, the second cylinder now being under tracer control and with the flow being to one end or the other thereof depending upon the positioning of the tracer control valve element 78, with the first cylinder now inactive.

At any time, however, when the changeover valve is rotated 180 degrees from one position to another, tracer control will remain in the particular cylinder under control; however, the effect of the movement of the tracer control valve 78 is reversed as far as the flow of fluid to a particular cylinder is concerned; that is, if the tracer in both cases is in a positive positioning, changing the changeover valve 180 degrees will cause a particular cylinder to move in one direction, which is the opposite from the initial direction controlled by the positive positioning of the tracer control valve. In other words, when you rotate 180 degrees, you do not change the control from one cylinder to the other; the control stays in the same cylinder, but the operative effect of the control valve is reversed.

Referring to Fig. 1, means are provided for supporting adjustably the tool holders carried by the top slide 44. More particularly, a pair of parallel guideways 154 are arranged upon the top slide 44, preferably in a direction parallel to the path of movement of the carriage 21, there being an inverted T slot 155 between said guideways. Tool holder plate 156 is adjustably and slidably mounted upon the ways 154 and carries the block standard 157 upon which is mounted the tool hold-down plate 158.

Figure 2:
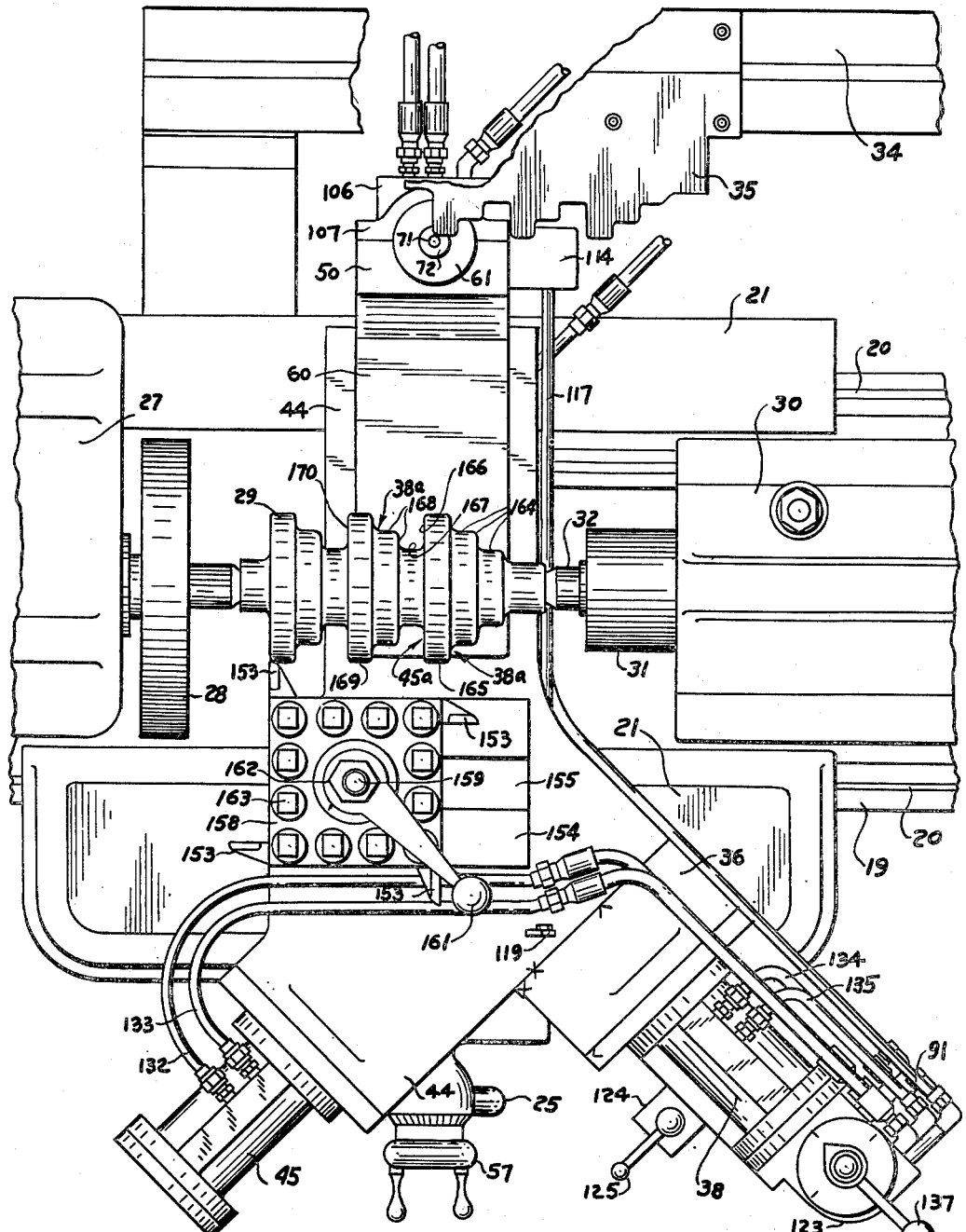

It will be seen from Fig. 1 and Fig. 2 that a plurality of cutting tools 153 may be mounted upon the tool holder plate 156 and retained between said plate and the tool hold-down plate 158. The latter is immovably secured to the block 157 by the plurality of set screws or bolts 163 which threadably extend down through plate 158 and into corresponding threaded openings in the block 157 to thereby immovably hold the cutter blades 153 within the tool holder proper.

The tool holder is swivel mounted upon the guideways 154 upon the T-bolt 159, which is retainingly positioned within the T-slot 155 and which extends upwardly through corresponding openings in the plates 156, 157, and 158. The T-bolt 159 extends upwardly beyond the top of the plate 158, and a cylindrically-shaped hold-down cap 160 is positioned upon said bolt with its lower surface bearing upon the top of the plate 158.

Manually rotatable locking arm 161 is threadably journaled upon the upper end of T-bolt 159 with its under surface operatively bearing upon the top surface of the cylindrical hold-down element 160 whereby once the tool holder is swiveled to the proper position, the cutting tool 153 or the particular cutting tool employed with respect to the work piece 29 will be properly positioned and secured against rotary movement about the T-bolt 159.

The top nut 162 is threadably positioned upon the upper end of the T-bolt 159 and is adapted to retain the locking arm 161 on said bolt.

For various types of cutting operations and particularly in under-cutting, it is often necessary to change the cutting tool 153 for one of a slightly different shape in order to thereby negotiate certain variations in the curvature of the intended work piece. This may be accomplished merely by loosening some of the said screws 163 so that the particular cutting tool previously employed may be removed and another cutting tool of the proper shape inserted and secured. On the other hand, a plurality of different-shaped cutting tools 153 may be positioned upon the tool compound and the desired cutting tool may be rotated into proper position merely by loosening the locking arm 161. Thereafter the same is tightened again and the compound is immovably retained in the proper position for the cutting operation.

Referring to Fig. 2, the work piece to be reproduced from the template 35 when finished includes a plurality of surfaces 164, 165, 166, 167, 168, 169, and 170.

In the formation of these various surfaces by the particular cutter employed, it is contemplated as part of the present invention that either of the cylinders 38 or 45 will be employed for a portion of the cutting operation depending upon the positioning of the particular surface to be cut. For example, reproducing the surfaces 164 and 165, the changeover valve 123 will be adjusted through rotation of its rotatable valve element 136 so that the tracer control will be in the cylinder 38 solely and the reproduction by the cutter will be along the line 38a indicated in Fig. 2 with respect to the work piece 29. It will be noted that throughout the cutting operation the carriage 21 is being continuously fed along lines parallel to the axis of the rotatable work piece. Naturally the present invention contemplates cutting devices where the work piece is stationary and the carriage 21 is movable in a predetermined plane. At any time while the cutter is negotiating the surface 165 and prior to going over the surface 166, it will be desirable to so adjust the changeover valve to switch tracer control from cylinder 38 to cylinder 45, and the feed movement to correspond to the arrow indicated at 45a corresponding to the feed movement of the cylinder 45. It follows, therefore, that for the balance of the cutting upon the surface 165, tracer control will be to the cylinder 45 and will continue as the cutter begins to move into the portion of the work piece designated by the numeral 166 and thereafter the surface 167 or a portion thereof.

At an intermediate portion of the surface 167, it is quite apparent that it is desirable to now switch back tracer control to the cylinder 38. This is done by again adjusting the changeover valve to the initial position so that the cutter is moving at an angle indicated by the arrow 38a, continually negotiating the surface 167 as well as the surfaces 168 and 169.

Midway or, for that matter, at any point along the surface 169, it will then be desirable to switch tracer control to the cylinder 45, and this is done by again adjusting the changeover valve to the second position above recited, with the tracer now controlling cylinder 45. The direction of feed movement of the cutter with respect to the work piece will then be again indicated by the arrow 45a, and the cutter will continue and complete the surface 169 and will continue over the surface 170.

By the present construction, it is apparent that by arranging the two cylinders 38 and 45 at angles to each other and at angles to the direction of movement of the carriage, it is possible to negotiate the entire surface of the work piece 29 corresponding to the surface of the template 35 throughout continuous feed movement of the carriage 21, it being necessary only that there be an operator to switch the changeover valve from one position to another, thereby changing the control from one cylinder to the other at the proper time.

It is quite apparent also that there is no great necessity for quickly changing over from one cylinder to the other, as above explained. For instance, the changeover valve may be changed at any time while the cutter is negotiating the surface 165, for example.

In the reproduction of under-cut surfaces from a template similarly under-cut, the changeover valve may be so arranged that a plus displacement of the tracer would cause the cutter to move downwardly as viewed in Fig. 2. This would be the movement required of the cutting tool in cutting a male part. Now, in negotiating an under-cut or female part, the changeover valve would be turned to a position 180 degrees from its initial position, with the result that the cutter would move in the opposite direction with the same type of positive placement of the tracer to thereby reproduce the female part.

As above described in detail, the switching of the changeover valve 180 degrees from one position to another merely reverses the direction effect caused by the tracer control valve with respect to one particular cylinder. It will be remembered that changing over 180 degrees turn, that the cylinder controlled is unchanged and further that only one cylinder is ever under tracer control at one time.

It is quite clear, then, that the tracer construction set out in Fig. 9 is intended to control the operation of the cylinders 38 and 45 one at a time with said tracer being adapted to control direction of movement of the respective cylinders as well as the speed of movement thereof. As to which cylinder will be controlled by the tracer, this depends entirely upon the manual operation of the changeover valve, and the time of operation of this cylinder is controlled by the tracer.

As viewed in Fig. 8, the changeover valve housing 123 is secured to the outer end of the hydraulic cylinder 38, movable therewith, said changeover valve being secured thereto at the point 170.

Referring now to Fig. 6, there is a drain conduit 91 from the hydraulic unit 120, which as above described is connected with the drain pipe 90 and the tracer valve housing 106. As shown in Fig. 6, the drain pipe 91 also continues to the lower end of the changeover valve housing 123 for also conducting away any seepage which collects within the lower end thereof.

What I claim as new is:

1. In a reproducing machine adapted for reproducing on a work piece the form and shape of a pattern and embodying a tracer for traveling over the pattern and a cutter for operating upon the work piece, a supporting body; a carriage slidably mounted on said body; a power-operated mechanism for moving said carriage longitudinally of said body; a cross-slide on said carriage movable transversely thereof; a second slide mounted on said cross-slide and movable relatively thereto diagonally to the direction of movement of said carriage and said cross-slide, and movable in unison with said cross-slide upon transverse movement of said cross-slide relatively to said carriage; a third slide mounted on said second slide and movable relatively thereto diagonally to the direction of movement of said carriage in an opposed direction to the direction of movement of said second slide, said third slide being movable in unison with said second slide upon movement of said second slide relatively to said cross-slide; and a tracer mechanism mounted on said third slide and movable in unison therewith for traveling over the surface of a pattern with which contacted upon movement of said slides in predetermined directions.

2. In a reproducing machine adapted for reproducing on a work piece the form and shape of a pattern and embodying a tracer for traveling over the pattern and a cutter for operating upon the work piece, a supporting body; a carriage slidably mounted on said body; a power-operated mechanism for moving said carriage longitudinally of said body; a cross-slide on said carriage movable transversely thereof; a second slide mounted on said cross-slide and movable relatively thereto diagonally to the direction of movement of said carriage and said cross-slide, and movable in unison with said cross-slide upon transverse movement of said cross-slide relatively to said carriage; a third slide mounted on said second slide and movable relatively thereto diagonally to the direction of movement of said carriage in an opposed direction to the direction of movement of said second slide, said third slide being movable in unison with said second slide upon movement of said second slide relatively to said cross-slide; and a tracer mechanism mounted on said third slide and movable in unison therewith for traveling over the surface of a pattern with which contacted upon movement of said slides in predetermined directions; and a tool holder mounted on said third slide for supporting a cutting tool, said tool holder being movable on said third slide; and a clamping mechanism for clamping said tool holder in fixed relation to said third slide.

3. In a reproducing machine adapted for use on a machine having a bed, a carriage slidably mounted on said bed, means for moving said carriage longitudinally of said bed, a cross-slide mounted on said carriage and slidable transversely of the direction of movement of said carriage, and means for moving said cross-slide relatively to said carriage: a second slide mounted on said cross-slide and movable in unison therewith upon movement of said cross-slide relatively to said carriage and movable relatively to said cross-slide in a direction extended diagonally to the direction of movement of said carriage in the direction of movement of said carriage; a third slide mounted on said second slide and movable in unison therewith upon movement of said second slide and movable relatively thereto diagonally to the direction of the movement of said carriage and in a direction opposed to the direction of movement of said carriage; a cutting tool support slidably mounted on said third slide; a clamping mechanism for clamping said cutting tool support in fixed relation to said third slide; and a cutting tool carried by said cutting tool support; a hydraulic motor for moving said second named slide; and a tracer mechanism engageable with a pattern and traveling over the surface thereof and adapted for controlling said hydraulic motor for controlling the movement of said second slide.

4. In a reproducing machine adapted for use on a machine having a bed, a carriage slidably mounted on said bed, means for moving said carriage longitudinally of said bed, a cross-slide mounted on said carriage and slidable transversely of the direction of movement of said carriage, and means for moving said cross-slide relatively to said carriage: a second slide mounted on said cross-slide and movable in unison therewith upon movement of said cross-slide relatively to said carriage and movable relatively to said cross-slide in a direction extended diagonally to the direction of movement of said carriage in the direction of movement of said carriage; a third slide mounted on said second slide and movable in unison therewith upon movement of said second slide and movable relatively thereto diagonally to the direction of the movement of said carriage and in a direction opposed to the direction of movement of said carriage; a cutting tool support slidably mounted on said third slide; a clamping mechanism for clamping said cutting tool support in fixed relation to said third slide; and a cutting tool carried by said cutting tool support; a hydraulic motor for moving said third slide; a tracer mechanism carried by said third slide and movable over the surface of a pattern to be reproduced for controlling the operation of said hydraulic motor for controlling the movement of said third slide.

5. In a reproducing machine adapted for use on a machine embodying a supporting bed, a carriage slidably mounted on said bed and movable longitudinally thereof, and means for moving said carriage longitudinally of said bed: a slide mounted on said carriage and movable longitudinally of said bed in unison with said carriage and movable relatively to said carriage diagonally to the direction of travel of said carriage and in a direction coincident with the direction of travel of said carriage; a second slide mounted on said first slide and movable in unison therewith upon movement of said first slide and movable relatively thereto in a direction diagonally to the direction of movement of said carriage and in a direction opposed to the direction of movement of said carriage; a cutting tool carried by said second slide, said cutting tool being slidably mounted on said second slide; clamping means for clamping said cutting tool in fixed relation to said second slide; a hydraulic motor for moving said first slide; a hydraulic motor for moving said second slide; a tracer mechanism carried by said second slide and adapted for traveling over the surface of a pattern to be reproduced, for controlling the operation of said hydraulic motors.

6. In a reproducing machine adapted for use on a machine embodying a supporting bed, a carriage slidably mounted on said bed and movable longitudinally thereof, and means for moving said carriage longitudinally of said bed: a slide mounted on said carriage and movable longitudinally of said bed in unison with said carriage and movable relatively to said carriage diagonally to the direction of travel of said carriage and in a direction coincident with the direction of travel of said carriage; a second slide mounted on said first slide and movable in unison therewith upon movement of said first slide and movable relatively thereto in a direction diagonally to the direction of movement of said carriage and in a direction opposed to the direction of movement of said carriage; a cutting tool carried by said second slide, said cutting tool being slidably mounted on said second slide; clamping means for clamping said cutting tool in fixed relation to said second slide; a hydraulic motor for moving said first slide; a hydraulic motor for moving said second slide; a tracer mechanism carried by said second slide and adapted for traveling over the surface of a pattern to be reproduced, for controlling the operation of said hydraulic motors as to time of operation, speed of operation, and direction of operation; and a manually operable valve for selectively connecting either of said hydraulic motors to said tracing mechanism for control thereby.

7. In a reproducing machine adapted for use on a machine embodying a supporting bed, a carriage slidably mounted on said bed and movable longitudinally thereof, and means for moving said carriage longitudinally of said bed: a slide mounted on said carriage and movable longitudinally of said bed in unison with said carriage and movable relatively to said carriage diagonally to the direction of travel of said carriage and in a direction coincident with the direction of travel of said carriage; a second slide mounted on said first slide and movable in unison therewith upon movement of said first slide and movable relatively thereto in a direction diagonally to the direction of movement of said carriage and in a direction opposed to the direction of movement of said carriage; and a cutting tool carried by said second slide, said cutting tool being slidably mounted on said second slide; a hydraulic motor for moving said first slide; a hydraulic motor for moving said second slide; a tracer mechanism carried by said second slide and adapted for traveling over the surface of a pattern to be reproduced, for controlling the operation of said hydraulic motors.

8. In a reproducing machine adapted for use on a machine embodying a supporting bed, a carriage slidably mounted on said bed and movable longitudinally thereof, and means for moving said carriage longitudinally of said bed: a slide mounted on said carriage and movable longitudinally of said bed in unison with said carriage and movable relatively to said carriage diagonally to the direction of travel of said carriage and in a direction coincident with the direction of travel of said carriage; a second slide mounted on said first slide and movable in unison therewith upon movement of said first slide and movable relatively thereto in a direction diagonally to the direction of movement of said carriage and in a direction opposed to the direction of movement of said carriage; a cutting tool carried by said second slide, said cutting tool being slidably mounted on said second slide; a hydraulic motor for moving said first slide; a hydraulic motor for moving said second slide.

9. In a reproducing machine adapted for use on a machine embodying a supporting bed, a carriage slidably mounted on said bed and movable longitudinally thereof, and means for moving said carriage longitudinally of said bed: a slide mounted on said carriage and movable longitudinally of said bed in unison with said carriage and movable relatively to said carriage diagonally to the direction of travel of said carriage and in a direction coincident with the direction of travel of said carriage; a second slide mounted on said first slide and movable in unison therewith upon movement of said first slide and movable relatively thereto in a direction diagonally in the direction of movement of said carriage and in a direction opposed to the direction of movement of said carriage; a cutting tool carried by said second slide, said cutting tool being slidably mounted on said second slide; a hydraulic motor for moving said first slide; a hydraulic motor for moving said second slide; and a manually operable valve for selectively rendering either of said hydraulic motors alternately operative and inoperative.

MANUEL TURCHAN.

REFERENCES CITED

The following references are of record in the file of this patent:

UNITED STATES PATENTS

| Number | Name | Date |
|---|---|---|
| 1,289,674 | Coradi | Dec. 31, 1918 |
| 2,120,196 | Wright | June 7, 1938 |
| 2,437,570 | Von Zelewsky | Mar. 9, 1948 |
| 2,474,134 | Waterson | June 21, 1949 |

FOREIGN PATENTS

| Number | Country | Date |
|---|---|---|
| 80,574 | Germany | Apr. 6, 1895 |